United States Patent [19]

Shimizu

[11] Patent Number: 4,519,911
[45] Date of Patent: May 28, 1985

[54] PAPER EXTRACTOR

[75] Inventor: Kimiaki Shimizu, Tokyo, Japan

[73] Assignee: System Communications, Inc., Tokyo, Japan

[21] Appl. No.: 480,506

[22] Filed: Mar. 29, 1983

[30] Foreign Application Priority Data

Jun. 3, 1982 [JP] Japan .............................. 57-82820[U]

[51] Int. Cl.³ .............................................. B01D 23/28
[52] U.S. Cl. ...................................... 210/478; 426/82; 426/433; 99/295; 210/481
[58] Field of Search ............... 210/474, 473, 477, 475, 210/476, 478, 479, 480, 481, 482, 497.2, 493.5; 99/306, 323, 323.3, 295; 426/77, 82, 433; D9/439, 434, 433; D7/47, 400, 399; 55/376, 377; 206/0.5, 216

[56] References Cited

U.S. PATENT DOCUMENTS 2,822,273  2/1958  Anderson .............................. 99/295
3,971,305  7/1976  Daswick ............................... 99/295

FOREIGN PATENT DOCUMENTS 2131124  1/1973  Fed. Rep. of Germany ........ 99/295
2235214  1/1974  Fed. Rep. of Germany ........ 99/295
1041044  10/1953  France ................................. 426/77
2270161  1/1976  France ................................. 99/323
65789  6/1975  Japan .
2703  1/1977  Japan .
130628  9/1980  Japan .
2091541  8/1982  United Kingdom ................. 426/82

Primary Examiner—Richard V. Fisher
Assistant Examiner—Wanda L. Millard
Attorney, Agent, or Firm—Wegner & Bretschneider

[57] ABSTRACT

A paper extractor including a support member in the form of a collar of a small wall-thickness having at its lower end two support legs facing each other, a filter attached to an inner surface of the support member, and coffee packs each including coffee powder sealed in a bag of filter cloth or filter paper. The support legs of the support member are each formed with folds in the form of a letter V to allow the support legs to be deformed and project outwardly when they are bent at the folds. By replacing the coffee pack by a new one, the paper extractor can be used several times before it is discarded, and the deformable support legs enable the paper extractor to be stably supported on the upper edge of a coffee cup.

3 Claims, 5 Drawing Figures

PAPER EXTRACTOR

BACKGROUND OF THE INVENTION

1. Field of the Invention

This invention relates to an expendable paper extractor for coffee making that can be used several times before it is discarded.

2. Description of the Prior Art

In one type of paper filter for coffee making of simple construction known in the art, filter paper is attached to a support plate made of paper. In another type known in the art, roasted ground coffee is packed in a bag of filter paper beforehand. One example of this type of filter is disclosed in Japanese Utility Model Publication No. 2703/77 and comprises a planar support plate capable of being bent and supported on the edge of a coffee cup, and a filter body attached to the underside of an opening formed at a central portion of the support plate and located above the coffee cup. Thus by pouring hot water through the opening, it is possible to effect extraction and filtering of coffee without immersing coffee powder in an extract in the cup. This type of filter suffers the disadvantage that it is not always possible to obtain stable support of the support plate on the edge of the coffee cup. Further disadvantages are that the filter is discarded each time it is used and is uneconomical, and that since the hot water is poured directly on to the coffee powder, coffee is immediately extracted when a large quantity of hot water is poured at once. Thus, the coffee powder is immediaely immersed in the hot water and is not allowed to settle by its own heat, making it impossible to make coffee of rich flavor.

SUMMARY OF THE INVENTION

This invention has been developed for the purpose of obviating the aforesaid disadvantages of the prior art. Accordingly the invention has as its objects the provision of a paper extractor, lending itself to use for several times before it is discarded, able to be stably supported on the upper edge of a coffee cup, and capable of making coffee of rich flavor.

According to the invention, there is provided a paper extractor comprising a support member in the form of a collar of a small wall-thickness having at its lower end a pair of support legs deformable to project outwardly by bending at folds, a filter attached to an inner surface of the support member, and a coffee pack including coffee powder sealed in a bag of filter paper or filter cloth.

DESCRIPTION OF THE PREFERRED EMBODIMENT

Figure 1:
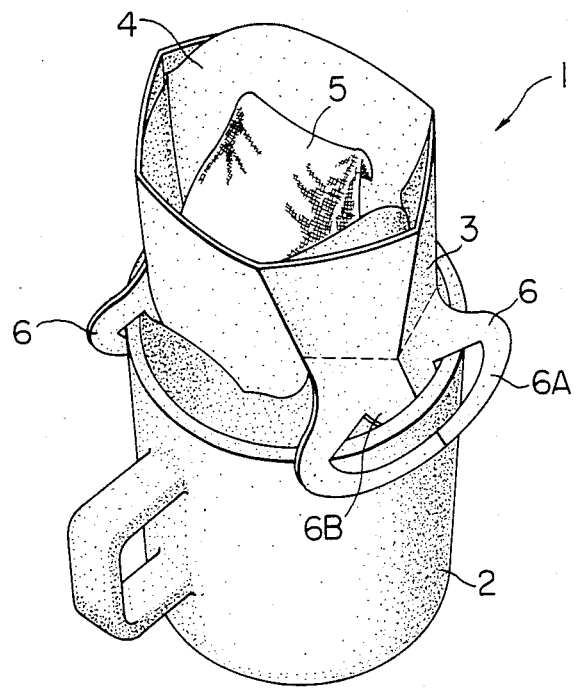
FIG. 1 is a perspective view of the paper extractor comprising one embodiment of the invention, shown in the state of use.
Figure 2:
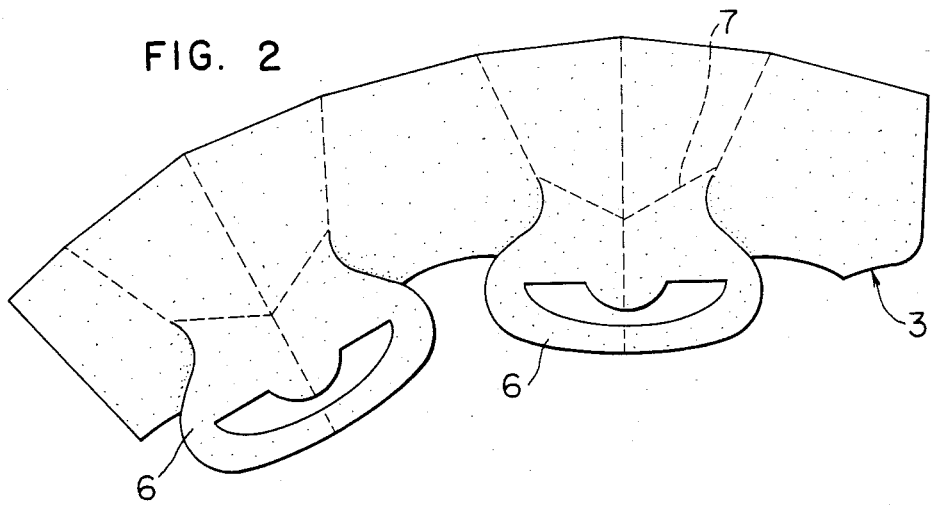
FIG. 2 is a plan view of the development sheet forming the support member of the paper extractor shown in FIG. 1.
Figure 3:
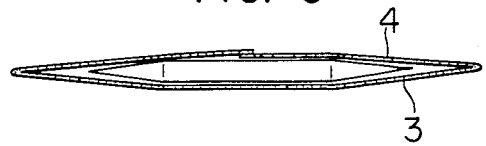
FIGS. 3 and 4 are a plan view and a side view of the embodiment shown in FIG. 1 respectively, shown in folded condition.

The invention will now be described by referring to a preferred embodiment. Referring to FIG. 1, one embodiment of a paper extractor 1 according to the invention is shown as being mounted on an upper edge of a coffee cup 2. The paper extractor 1 comprises a support member 3, a filter 4 attached to an inner surface of the support member 3 and a coffee pack 5. The support member 3 is in the form of a collar of a small wall-thickness, formed of paper or plastics, which is hexagonal in cross section and has at its lower end two legs 6 facing each other. The support legs 6 are connected to a collar portion of the support member 3 through folds 7 in the form of a letter V, so that the legs 6 can be deformed to project outwardly with respect to the collar portion, as shown, when intended to be mounted on the upper edge of the coffee cup 2. As can be seen, the "V" opens upwardly when the extractor is in use. The support legs 6 are each formed with an annular projection 6A and an inner projection 6B adapted to hold the upper edge of the coffee cup 2 therebetween. FIG. 2 shows the development of sheet material used for forming the support member 3 in which broken lines represent the folds 7. As can be seen in FIGS. 1 and 2, the extractor collar portion is provided with a plurality of substantially longitudinal fold lines, six in this embodiment. These fold lines allow the extractor to be folded flat, as can be seen in FIG. 3. Each of the V-shaped folds includes a pair of folds which meet at one of the longitudinal folds, and extend toward the upper opening of the collar.

The filter 4 is formed of ordinary filter paper or filter cloth generally used for filtering coffee and is attached to the inner surface of the collar portion of the support member 3 in a suitable position. The coffee pack 5 comprises coffee powder of a volume suitable for extracting coffee to fill the cup 2, and a bag of filter paper or filter cloth, preferably made of nylon gauze, for sealing the coffee powder therein.

Figure 4:
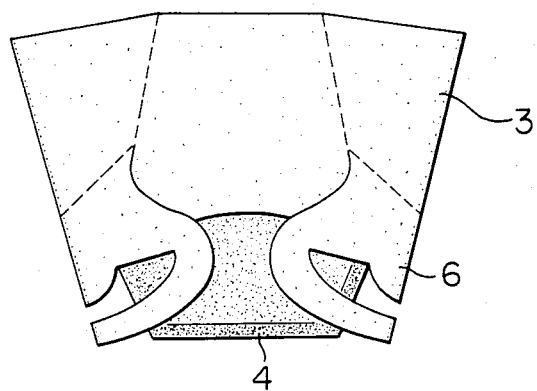
Figure 5:
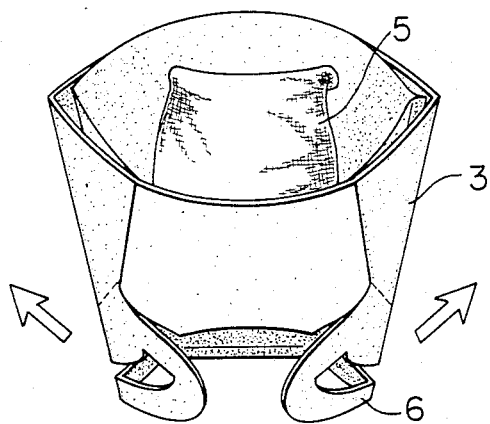
FIG. 5 is a perspective view of the embodiment in FIGS. 3 and 4, shown in the process of use.

When the paper extractor according to the invention is put on the market, the support member 3 and the filter 4 are folded flat as shown in FIGS. 3 and 4, and a plurality of coffee packs 5 are combined with the assembly of the support member and the filter as a unit. When the user wishes to make coffee, the flat support member 3 is opened at its upper end to bring it into a collar shape as shown in FIG. 5, and the coffee pack 5 is placed inside the support member 3. Then the support legs 6 are bent outwardly as indicated by an arrow and placed on the upper edge of the coffee cup 2, as shown in FIG. 1. Now the paper extractor is ready for accepting hot water. The poured hot water poured gradually flows through meshes of the filter paper or filter cloth into the coffee pack 5 and wets and heats the coffee powder, so as to allow the coffee powder to settle by its own heat. After the coffee powder has settled, extraction of coffee takes place, to enable coffee of rich flavor to be made. At this time, the hot water poured increases the weight of the paper extractor 1. However, since the support legs 6 project outwardly by bending at the folds 7, the collar portion of the support member 3 sits well on the coffee cup 2, thereby enabling the paper extractor 1 to be stably supported on the cup 2. After a cup of coffee is prepared, the coffee pack 5 is discarded. By placing a fresh coffee pack 5 in the support member 3, a second cup of coffee can be made by using the same support member 3 and the same filter 4 as used in making the first cup of coffee. The paper extractor 1 is discarded after coffee making has been done in as many cups as desired.

From the foregoing description, it will be appreciated that the support member having the filter attached to its inner surface is provided with support legs which can be deformed to project outwardly. This features enables the paper extractor to be supported stably on the upper edge of a coffee cup. Another feature of the invention that coffee powder is sealed in a bag of filter paper or filter cloth to provide a coffee pack enabling hot water to flow gradually through meshes into the bag even if the hot water is poured in haste. This allows the coffee powder in the bag to be heated and settle by its own heat, to enable coffee of rich flavor to be made at all times. The paper extractor according to the invention is economical because as many coffee cups as possible can be filled with coffee extract obtained by using the same support member and the same filter merely by replacing the coffee pack.

What is claimed is:

1. A paper extractor, comprising:
   a thin walled, collar-shaped support member, having therein:
   means defining an upper opening;
   means defining a lower opening;
   a plurality of substantially longitudinally first folds extending between said upper and lower openings, allowing said support member to be folded into a flat shape;
   two V-shaped second folds, opening upwardly with respect to said lower opening, each second fold intersecting one of said longitudinal folds; and
   support legs extending from said second folds, bendable at said second folds to extend outwardly from the support member;
   a filter attached to an inner surface of said support member; and
   a coffee pack comprising coffee powder sealed in a bag of filter material, for insertion into said support member in juxtaposed relationship to the filter attached thereto.

2. A paper extractor as claimed in claim 1, wherein each of said legs comprises an annular projection and an inner projection, said projections being capable of accepting an upper rim of a coffee cup therebetween.

3. A paper extractor as claimed in claim 1, wherein said support member has a hexagonal cross-sectional shape and six longitudinal folds.

* * * * *